United States Patent

Nakanishi et al.

Patent Number: 5,176,746
Date of Patent: Jan. 5, 1993

[54] OIL INK COMPOSITION

[75] Inventors: Mikihiko Nakanishi, Kawachinagano; Takahiro Shirai, Yao, both of Japan

[73] Assignee: Sakura Color Products Corporation, Japan

[21] Appl. No.: 761,461

[22] Filed: Sep. 18, 1991

[30] Foreign Application Priority Data

Sep. 20, 1990 [JP] Japan .................. 2-252693

[51] Int. Cl.$^5$ ............................................. C09D 11/14
[52] U.S. Cl. ............................ 106/25 R; 401/199
[58] Field of Search ............................ 106/20-25

[56] References Cited

U.S. PATENT DOCUMENTS 4,628,000 12/1986 Talvalkar et al. .................. 428/341
4,931,095 6/1990 Nowak et al. .................... 106/22

FOREIGN PATENT DOCUMENTS 62-130882 6/1987 Japan .

Primary Examiner—Mark L. Bell
Assistant Examiner—Margaret V. Einsmann
Attorney, Agent, or Firm—Larson and Taylor

[57] ABSTRACT

Disclosed is an ink composition including a coloring agent and an alcohol solvent, the composition being characterized in that the composition contains a sucrose benzoate represented by the formula $$Suc(C_6H_5COO)_n$$

in which Suc is a sucrose residue of the formula $C_{12}H_{22-n}O_{11-n}$ and n is 6 to 8.

6 Claims, No Drawings

OIL INK COMPOSITION

The present invention relates to an oil ink composition and more particularly to an improvement of an oil ink composition containing an alcohol solvent and a coloring agent.

Oil inks containing an alcohol solvent are widely used because of their low toxicity and the excellent ability of the solvent to dissolve or disperse the coloring agent therein. However, when such oil inks are deposited by coating, writing, printing or otherwise on articles of cloths such as clothes, flags and so on which are repeatedly used and washed, the coloring agent in the ink dissolves out during each washing, thereby decolorizing the article. In short, these conventional oil inks are impaired in the ability to anchor on materials by contact with water and/or a detergent, and are unsatisfactory in the resistance to washing.

An object of the present invention is to provide an oil ink composition containing an alcohol solvent and free of the foregoing drawback, the composition being eminently improved in the ability to anchor on materials and excellent in the resistance to washing.

According to the present invention, there is provided an oil ink composition comprising a coloring agent and an alcohol solvent, the composition being characterized in that the composition contains a sucrose benzoate represented by the formula (1)

$$\text{Suc}(C_6H_5COO)_n \qquad (1)$$

wherein Suc is a sucrose residue represented by $C_{12}H_{22-n}O_{11-a}$ 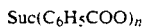 and n is 6 to 8.

Our research shows that an oil ink containing an alcohol solvent and a sucrose hexa-, hepta- and/or octa-benzoate of the formula (1) wherein n is 6 to 8 has a pronouncedly improved ability to anchor on cloths and a remarkably enhanced resistance to washing and is unlikely to lose the color by repeated washing. It is known to produce oil inks excellent in the drying property by incorporating into an ink a sucrose mono-, bi- or tri-benzoate of the formula (1) wherein n is 1 to 3 (e.g., as disclosed in Japanese Unexamined Patent Publication No.60-84369). However, the sucrose benzoate wherein n is 1 to 3 does not improve the resistance of inks to washing. In the above current situation, our research found for the first time that when a sucrose hexa-, hepta- and/or octa-benzoate of the formula (1) wherein n is 6 to 8 is incorporated into an oil ink, the ink is pronouncedly improved in the resistance to washing.

Generally the sucrose benzoates of the formula (1) for use in the present invention are easily available in the form of a mixture of sucrose hexa-, hepta- and octa-benzoates of the formula (1) wherein n is 6 to 8. Such mixture can be used as it is without isolating each benzoate from the others to accomplish the object of the invention, although the sucrose benzoate isolated can be used singly. The mixture may contain a minor amount of sucrose benzoates wherein n is 5 or less. While the sucrose benzoates wherein n is 4 or 5 are difficult to obtain in predominant amounts, the sucrose benzoates wherein n is 1 to 3 are easily available but can not enhance the resistance to washing in inks.

The sucrose benzoate is used in a concentration of about 1 to about 20% by weight in the ink composition of the invention. The sucrose benzoate used in a concentration of less than 1% by weight gives the ink an insufficient resistance to washing, whereas the sucrose benzoate used in a concentration exceeding 20% by weight renders the ink too high in the viscosity. Thus the sucrose benzoate in a concentration outside the foregoing range is undesirable to use. A preferred concentration of the sucrose benzoate is about 2 to about 15% by weight.

Alcohol solvents useful in the invention are not specifically limited and include a wide variety of those conventionally used in the art of oil inks. Suitable examples are aliphatic lower alcohols such as ethanol, n-propanol, isopropanol, n-butanol and isobutanol; benzyl alcohol and like aromatic alcohols; glycols such as ethylene glycol and propylene glycol; glycol ethers such as ethylene glycol monomethyl ether, ethylene glycol monoethyl ether, ethylene glycol monobutyl ether, propylene glycol monomethyl ether, diethylene glycol monomethyl ether, dipropylene glycol monomethyl ether, 3-methoxybutanol, 3-methyl-3-methoxybutanol, phenoxyethanol, etc. Of these alcohols, preferred are ethanol, n-propanol, isopropanol, n-butanol, isobutanol, propylene glycol, propylene glycol monomethyl ether, dipropylene glycol monomethyl ether, 3-methyl-3-methoxybutanol, etc. which have low toxicity. These solvents can be used singly or at least two of them are usable in mixture. The concentration of the solvent in the ink composition of the invention is in the range of about 50 to about 98% by weight, preferably about 60 to about 97% by weight, based on the whole composition, so that the ink composition has a proper viscosity.

The coloring agent for use in the invention is selected from a wide range of dyes soluble or dispersible in alcohols and organic or inorganic pigments. Useful pigments include those with the surface modified with a resin. Specific examples are azo-, azine-, nigrosine-, anthraquinone-, phthalocyanine- and triarylmethane-type pigments. As a matter of course, the lower the content of the coloring agent, the paler the color, whereas the greater the content thereof, the excessively higher the viscosity and the poorer the writability. A suitable content of the coloring agent in the ink composition of the invention is about 0.5 to about 20% by weight, preferably about 1 to about 15% by weight, based on the whole composition.

When required, the ink composition of the invention may further contain an oil-soluble resin as a binder resin. Examples of oil-soluble resins include a wide variety of alcohol-soluble resins conventionally used in the art of oil inks. Specific examples are phenolic resins such as rosin-modified phenolic resin, terpene phenol resin, alkylphenol resin and alkylphenol xylene resin, ketone resins such as ketone formaldehyde resin, cellulose compounds, polyamide resins, acrylic resins, rosins, polyvinyl butyral resins, etc. The content of the binder resin is usually about 25% by weight or less, preferably about 0.5 to about 20% by weight, based on the whole composition. The presence of the binder resin in the ink further enhances the ability to anchor on materials.

When required, additives conventionally used for oil inks in the art may be incorporated into the ink composition of the invention. Useful additives include, for example, oleic acid and like dissolving auxiliaries, pigment dispersants, viscosity modifiers, leveling agents, plasticizers and the like.

The ink compositions of the present invention comprising the foregoing components have an excellent ability to anchor on a substrate of materials such as paper, wood, metals, cloths, pottery or the like. Especially the ink compositions of the invention are effectively used for various cloths of natural or synthetic fibers, and when used by coating, writing, printing or otherwise, exhibit a markedly higher resistance to washing than conventional oil inks.

EXAMPLES

The following examples are given to clarify the features of the present invention.

Examples 1-5 and Comparison Examples 1-6

Ink compositions were prepared by homogeneously mixing the components in the ratio (% by weight) shown in Table 1 below:

The symbols used in Table 1 designate the following materials.

Coloring agent I: Azo-type (trade name "VARIFAST BLACK 3820", product of Orient Chemical Ind., Ltd.)

Coloring agent II: Butyral resin processing pigment (trade name "FUJI AS BLACK", product of Fuji Pigment Co., Ltd.)

Coloring agent III: Triarylmethane-type (trade name "Oil Blue 603", product of Orient Chemical Ind., Ltd.)

Coloring agent IV: Nigrosine-type (trade name "Oil Black B", product of Chuo Synthetic Chemical Co., Ltd.)

Solvent I: Ethylene glycol monoethyl ether
Solvent II: Propylene glycol monomethyl ether
Solvent III: Ethanol
Solvent IV: Ethylene glycol monomethyl ether
Resin I: Alkylphenol resin ("TAMANOL 510", product of Arakawa Chemical Industries, Ltd.)
Resin II: Ketone resin ("HILAC 110H", product of Hitachi Chemical Co., Ltd.)
Resin III: Rosin ("Rosin WW", product of Hitachi Chemical Co., Ltd.)
Additive I: A mixture of sucrose benzoates represented by the formula:

$$C_{12}H_{22-n}O_{11-n}(C_6H_5COO)_n$$

wherein n is 6 to 8

Additive II (Comparison): A mixture of sucrose benzoates represented by the foregoing formula wherein n is 1 to 3

Auxiliary I: Oleic acid

TABLE 1

| Components | Examples | | | | | Comparison Examples | | | | | |
|---|---|---|---|---|---|---|---|---|---|---|---|
| | 1 | 2 | 3 | 4 | 5 | 1 | 2 | 3 | 4 | 5 | 6 |
| Coloring agent I | 10 | 10 | | | | 10 | 10 | | | | 10 |
| Coloring agent II | | 8 | | | | | | 8 | | | |
| Coloring agent III | | | 5 | | | | | | 5 | | |
| Coloring agent IV | | | | 10 | | | | | | 10 | |

TABLE 1-continued

| Components | Examples | | | | | Comparison Examples | | | | | |
|---|---|---|---|---|---|---|---|---|---|---|---|
| | 1 | 2 | 3 | 4 | 5 | 1 | 2 | 3 | 4 | 5 | 6 |
| Solvent I | 75 | | | | | 90 | | | | | 75 |
| Solvent II | | 82 | | 75 | | | 86 | | 85 | | |
| Solvent III | | | 80 | | | | | 92 | | | |
| Solvent IV | | | | | 76 | | | | | 78 | |
| Additive I | 15 | 4 | 12 | 10 | 2 | | | | | | |
| Additive II | | | | | | | | | | | 15 |
| Resin I | | 4 | | | | | 4 | | | | |
| Resin II | | | 10 | | | | | 10 | | | |
| Resin III | | | | 10 | | | | | 10 | | |
| Auxiliary I | | | | | 2 | | | | | 2 | |

The obtained ink composition was charged into a felt-tipped pen and writing was performed on a cloth piece (65% polyester and 35% cotton) with the marker. The cloth piece was dried at room temperature and atmospheric humidity for 30 minutes. The cloth piece was washed in a washing solution of 0.4% soap powder by means of a household washing machine for 15 minutes and air-dried. After the above washing-and-drying cycle was repeated 5 times, the writing was observed to evaluate the degree of decoloration. Table 2 below shows the evaluation results. The degree of decoloration was evaluated according to the following criteria.

TABLE 2

| Examples | | | | | Comparison Examples | | | | | |
|---|---|---|---|---|---|---|---|---|---|---|
| 1 | 2 | 3 | 4 | 5 | 1 | 2 | 3 | 4 | 5 | 6 |
| A | A | A | A | A | C | B | C | B | B | C |

A: Substantially not decolorized.
B: Slightly decolorized.
C: Considerably decolorized.

The foregoing results show that the ink compositions of the invention exhibit a remarkably high resistance to washing.

What we claim is:

1. An oil ink composition for writing which comprises about 60 to about 97% by weight of an alcohol solvent having dissolved therein a coloring agent and a mixture of sucrose hexa-, hepta- and octa-benzoates represented by the formula $$Suc(C_6H_5COO)n$$

wherein Suc is a sucrose residue represented by $C_{12}H_{22-n}O_{11-n}$ and n is 6 to 8.

2. An oil ink composition according to claim 1 which contains about 1 to about 20% by weight of the sucrose benzoate.

3. An oil ink composition according to claim 2 wherein the concentration of the sucrose benzoate is about 2 to about 15% by weight.

4. An oil ink composition according to claim 1 which contains an alcohol-soluble binder resin.

5. An oil ink composition according to claim 4 which contains about 0.5 to about 20% by weight of the binder resin.

6. A felt-tipped pen charged with the oil ink composition of claim 1.

* * * * *